US010636088B2

(12) United States Patent
Glinberg et al.

(10) Patent No.: US 10,636,088 B2
(45) Date of Patent: Apr. 28, 2020

(54) HYBRID CROSS-MARGINING

(75) Inventors: Dmitriy Glinberg, Northbrook, IL (US); Edward Gogol, Skokie, IL (US); Tae Seok C. Yoo, Bartlett, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 955 days.

(21) Appl. No.: 13/085,094

(22) Filed: Apr. 12, 2011

(65) Prior Publication Data

US 2011/0191235 A1     Aug. 4, 2011

Related U.S. Application Data

(63) Continuation of application No. 12/858,911, filed on Aug. 18, 2010, now Pat. No. 7,930,245, which is a continuation of application No. 11/452,673, filed on Jun. 14, 2006, now Pat. No. 7,801,810.

(60) Provisional application No. 60/738,246, filed on Nov. 18, 2005.

(51) Int. Cl.
| | | |
|---|---|---|
| *G06Q 40/00* | (2012.01) | |
| *G06Q 40/04* | (2012.01) | |
| *G06Q 40/06* | (2012.01) | |
| *G06Q 40/02* | (2012.01) | |

(52) U.S. Cl.
CPC ............ *G06Q 40/04* (2013.01); *G06Q 40/00* (2013.01); *G06Q 40/025* (2013.01); *G06Q 40/06* (2013.01)

(58) Field of Classification Search
None
See application file for complete search history.

(56) References Cited

U.S. PATENT DOCUMENTS

| | | |
|---|---|---|
| 4,980,826 A | 12/1990 | Wagner |
| 5,963,923 A | 10/1999 | Garber |
| 6,021,397 A | 1/2000 | Jones et al. |
| 6,317,727 B1 | 11/2001 | May |
| 6,321,212 B1 | 11/2001 | Lange |
| 6,347,307 B1 | 2/2002 | Sandhu et al. |
| 6,405,180 B2 | 6/2002 | Tilfors et al. |
| 6,421,653 B1 | 7/2002 | May |

(Continued)

FOREIGN PATENT DOCUMENTS

| | | |
|---|---|---|
| GB | 2 417 345 A | 2/2006 |
| JP | 7-506916 A | 7/1995 |

(Continued)

OTHER PUBLICATIONS

Cross, Sam Y., "All About . . . the Foreign Exchange Market in the United States," Federal Bank of New York, 1998, pp. 62-74 of Japanese translation, pp. 31-36 of original version.

(Continued)

*Primary Examiner* — Jason Borlinghaus
(74) *Attorney, Agent, or Firm* — Lempia Summerfield Katz LLC

(57) ABSTRACT

A hybrid cross-margining system is disclosed. The disclosed provides for both joint accounts, maintained by multiple exchanges, as well as non-joint accounts, whereby the system recognizes both intra-account offsets within the joint account and inter-exchange offsets between the joint account and accounts maintained by another exchange to minimize the margin requirement of the associated market participant with respect to the positions reflected in these accounts.

17 Claims, 10 Drawing Sheets

(56) References Cited

U.S. PATENT DOCUMENTS

| | | |
|---|---|---|
| 6,618,707 B1 | 9/2003 | Gary |
| 6,658,393 B1 | 12/2003 | Basch et al. |
| 6,721,715 B2 | 4/2004 | Nemzow |
| 6,963,856 B2 | 11/2005 | Lutnick et al. |
| 6,996,540 B1 | 2/2006 | May |
| 7,039,610 B2 | 5/2006 | Morano et al. |
| 7,043,457 B1 | 5/2006 | Hansen |
| 7,080,050 B1 | 7/2006 | Himmelstein |
| 7,089,206 B2 | 8/2006 | Martin |
| 7,130,789 B2 | 10/2006 | Glodjo et al. |
| 7,177,833 B1 | 2/2007 | Marynowski et al. |
| 7,194,481 B1 | 3/2007 | Van Roon |
| 2001/0014875 A1 | 8/2001 | Young et al. |
| 2001/0042785 A1 | 11/2001 | Walker et al. |
| 2001/0049649 A1* | 12/2001 | Baecker .............. G06Q 40/00 705/37 |
| 2001/0056398 A1 | 12/2001 | Scheirer |
| 2002/0002530 A1 | 1/2002 | May |
| 2002/0035531 A1 | 3/2002 | Push |
| 2002/0046152 A1 | 4/2002 | Kinney et al. |
| 2002/0052827 A1 | 5/2002 | Waelbroeck et al. |
| 2002/0070915 A1 | 6/2002 | Mazza et al. |
| 2002/0077947 A1* | 6/2002 | Ward et al. .............. 705/36 |
| 2002/0099651 A1 | 7/2002 | May |
| 2002/0116314 A1 | 8/2002 | Spencer et al. |
| 2002/0116317 A1 | 8/2002 | May |
| 2002/0156719 A1 | 10/2002 | Finebaum et al. |
| 2002/0169774 A1 | 11/2002 | Greenbaum et al. |
| 2002/0178102 A1 | 11/2002 | Scheinberg et al. |
| 2002/0184134 A1 | 12/2002 | Olsen et al. |
| 2003/0009419 A1 | 1/2003 | Chavez et al. |
| 2003/0023542 A1 | 1/2003 | Kemp et al. |
| 2003/0033240 A1 | 2/2003 | Balson et al. |
| 2003/0050879 A1 | 3/2003 | Rosen et al. |
| 2003/0069830 A1* | 4/2003 | Morano et al. .............. 705/37 |
| 2003/0093360 A1 | 5/2003 | May |
| 2003/0125982 A1 | 7/2003 | Ginsberg et al. |
| 2003/0200167 A1 | 10/2003 | Kemp et al. |
| 2003/0220868 A1 | 11/2003 | May |
| 2003/0229571 A1 | 12/2003 | May |
| 2003/0236737 A1 | 12/2003 | Kemp et al. |
| 2004/0015430 A1 | 1/2004 | May |
| 2004/0015431 A1 | 1/2004 | May |
| 2004/0024691 A1 | 2/2004 | Satow et al. |
| 2004/0024692 A1 | 2/2004 | Turbeville et al. |
| 2004/0049738 A1 | 3/2004 | Thompson et al. |
| 2004/0064395 A1 | 4/2004 | Mintz et al. |
| 2004/0093300 A1 | 5/2004 | Burns |
| 2004/0103054 A1 | 5/2004 | Singer |
| 2004/0117302 A1 | 6/2004 | Weichert et al. |
| 2004/0148242 A1 | 7/2004 | Liu |
| 2004/0153391 A1 | 8/2004 | Burns et al. |
| 2004/0153392 A1 | 8/2004 | West et al. |
| 2004/0153393 A1 | 8/2004 | West et al. |
| 2004/0153394 A1 | 8/2004 | West et al. |
| 2004/0172337 A1 | 9/2004 | Spoonhower et al. |
| 2004/0186806 A1 | 9/2004 | Sinclair et al. |
| 2004/0210514 A1 | 10/2004 | Kemp et al. |
| 2004/0236662 A1 | 11/2004 | Korhammer et al. |
| 2004/0254804 A1 | 12/2004 | Peterffy et al. |
| 2004/0260640 A1 | 12/2004 | Crosthwaite et al. |
| 2005/0044027 A1 | 2/2005 | Rodgers et al. |
| 2005/0080703 A1 | 4/2005 | Chiesa et al. |
| 2005/0086152 A1 | 4/2005 | Sweeting |
| 2005/0097027 A1 | 5/2005 | Kavanaugh |
| 2005/0137964 A1 | 6/2005 | Nordlicht et al. |
| 2005/0171890 A1 | 8/2005 | Daley et al. |
| 2005/0171894 A1 | 8/2005 | Traynor |
| 2005/0246263 A1 | 11/2005 | Ogg et al. |
| 2005/0283422 A1 | 12/2005 | Myr |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0095363 A1 | 5/2006 | May |
| 2006/0017761 A1 | 8/2006 | Costakis |
| 2006/0173771 A1 | 8/2006 | Johnston |
| 2006/0190371 A1 | 8/2006 | Almgren et al. |
| 2006/0190383 A1 | 8/2006 | May |
| 2006/0218071 A1 | 9/2006 | Sweeting |
| 2006/0224494 A1 | 10/2006 | Pinkava |
| 2006/0265296 A1 | 11/2006 | Glinberg et al. |
| 2007/0011079 A1 | 1/2007 | May |
| 2007/0239591 A1 | 10/2007 | May |
| 2007/0282733 A1 | 12/2007 | May |
| 2008/0077320 A1 | 3/2008 | Loftus et al. |
| 2010/0312720 A1 | 12/2010 | Glinberg et al. |

FOREIGN PATENT DOCUMENTS

| | | |
|---|---|---|
| JP | 11-507150 A | 6/1999 |
| JP | 2002-207881 | 7/2002 |
| JP | 2003-050912 A | 2/2003 |
| JP | 2003-536170 A | 12/2003 |
| JP | 2004-021906 | 1/2004 |
| JP | 2004 234197 | 8/2004 |
| WO | WO 93-15467 A1 | 8/1993 |
| WO | WO 96-41293 A1 | 12/1996 |
| WO | WO 01/11518 | 2/2001 |
| WO | WO 01/98968 A2 | 12/2001 |
| WO | WO 2004/042514 A2 | 5/2004 |
| WO | WO 2005/041079 A2 | 5/2005 |

OTHER PUBLICATIONS

Cross, Sam Y., "All About . . . the Foreign Exchange Market in the United States," Federal Bank of New York, 1998, pp. 42-60 and 121-132 of Japanese translation, pp. 21-30 and 59-66 of original version.

Hall, Alvin D., "Getting Started in Stocks," Third Edition, Coughlan Publishing, 1997, pp. 105-114.

Nobuyuki Kitamura et al., "The current situations and issues of electronic commerce: Birth of new type brokers and their trust formation," Discussion Paper Series 2000-J-13, Institute for Money and Economic Studies, Bank of Japan (see p. 26).

Sander, Jennifer Basye et al., The Complete Idiot's Guide to Day Trading Like a Pro, Alpha Books, copyright 1999, pp. 65-67.

Office Action dated Feb. 2, 2012 for Canadian Application No. 2,626,935, 4 pages.

Office Action dated May 23, 2012 for Canadian Application No. 2,628,879, 3 pages.

Office Action dated Mar. 21, 2012 for Japanese Application No. 2008-541147, 9 pages.

Office Action dated May 8, 2012 for Japanese Application No. 2008-541410, 5 pages.

Office Action dated May 8, 2012 for Japanese Application No. 2008-541219, 5 pages.

CME® Foreign Exchange Products "Trading CME FX Futures: Maximizing the Opportunity for the Individual Investor", 6 pages © 2005.

CME "Glossary for Retail FX", obtained from http://www.cme.com/files/FXWebglossary.pdf, last accessed Nov. 7, 2005, 16 pages.

CME® Clearing Services "CME and LCH" , advisory notice, obtained from http://www/web.archive.org/web/20050306002321/http://www.cme.com/clearing/rmspan/cm/lch . . . , last accessed Feb. 22, 2007, 1 page.

CME "Clearing Services Layout for Results", advisory notice, obtained from http://www/web.archive.org/web/20050308181020/http://www.cme.com/clearing/rmspan/cm/rec . . . , last accessed Feb. 22, 2007, 2 pages.

Special Executive Report, Increase in Position Limits on CME Russell 2000® and e-Mini® Russell 2000 Contracts, w pages, Apr. 20, 2006, Chicago Mercantile Exchange, Inc.

Notice—Revised Position Limits in Treasury Futures During Last Ten Trading Days, Jul. 19, 2006, Paul J. Draths—Vice President & Secretary, Chicago Board of Trade, 3 pages.

(56) References Cited

OTHER PUBLICATIONS

CME EOS Trader™ Enhancements: Credit Controls, Chicago Mercantile Exchange, Inc., Mar. 25, 2007, 3 pages.
Position Limits and Position Accountability, ICE Futures U.S., Feb. 15, 2008, www.theice.com, 5 pages.
Nina Mehta, "Fast and Furious: Risk Management in a DMA Environment", Jul./Aug. 2006 Futures Industry, 3 pages.
http://www.cftc.gov/industryoversight/contractsandproducts/sfpspeculativelimits.html, Security Futures Products Speculative Position Limits, Jul. 26, 2007, U.S. Commodity Futures Trading Commission, 1 page.
http://www.investopedia.com/terms/p/positionlimit.asp, Position Limit, Mar. 19, 2009, 4 pages.
http://www.cftc.gov/index.htm, U.S. Commodity Futures Trading Commission, "What's New at the CFTC", Mar. 18, 2009, 2 pages.
http://www.cftc.gov/industryoversight/tradingorganizations/index.htm3, "Trading Organizations", Nov. 9, 2007, 1 page.
http://www.cftc.gov/industryoversight/clearingorganizations.index.htm, "Clearing Organizations", Jun. 17, 2008, 2 pages.
Kuprianov, "Money Market Futures", Federal Reserve Bank of Richmond, Economic Review, Nov./Dec. 1992, 19 pages.
International Search Report, PCT/US2008/071452, dated Oct. 7, 2008.
International Search Report, PCT/IB04/52236, dated Mar. 24, 2006.
International Search Report PCT/US2006/028001, dated May 7, 2007.
International Search Report, PCT/US2006/027762, dated Mar. 9, 2007.
International Search Report, PCT/US2006/044917, dated Aug. 28, 2007.
International Search Report, PCT/US2006/044932, dated Aug. 19, 2008.
International Search Report, PCT/US2006/043282, dated May 30, 2008.
International Search Report, PCT/US2006/044702, dated Oct. 25, 2007.
Examiner's Report from corresponding Canadian Patent Application No. CA 2,628,879, 4pp., dated Jan. 3, 2014.
Decision of Refusal from corresponding Japanese Patent Application No. 2008-541147, 2pp., dated Oct. 30, 2013.
Examiner's Report from corresponding Canadian Patent Application No. CA 2,626,935, 5pp., dated Jul. 3, 2013.
Second Japanese Office Action, cited in corresponding Japanese patent application No. 2008-541219, 5 pgs., dated Jan. 30, 2013.
Japanese Office Action, cited in corresponding Japanese patent application No. 2008-541147, 5 pgs., dated Feb. 19, 2013.
Takashi Nishizawa, Introduction to FX Net-Trading, Mar. 30, 2005, Nihonbungeisha, p. 12.
Makoto Saito, Concept and Usage of Financial Technologies, Jul. 20, 2000, Yuhikaku Publishing Co., Ltd., pp. 60-62.
Hiroshi Yonemura, Theory of Monetary Economics and Securities for Investment Engineering, Mar. 29, 2001, Toyo Keizai Inc., pp. 53-55.

* cited by examiner

Cross-margining utilizes X-Margin margin that was *Not Offset*

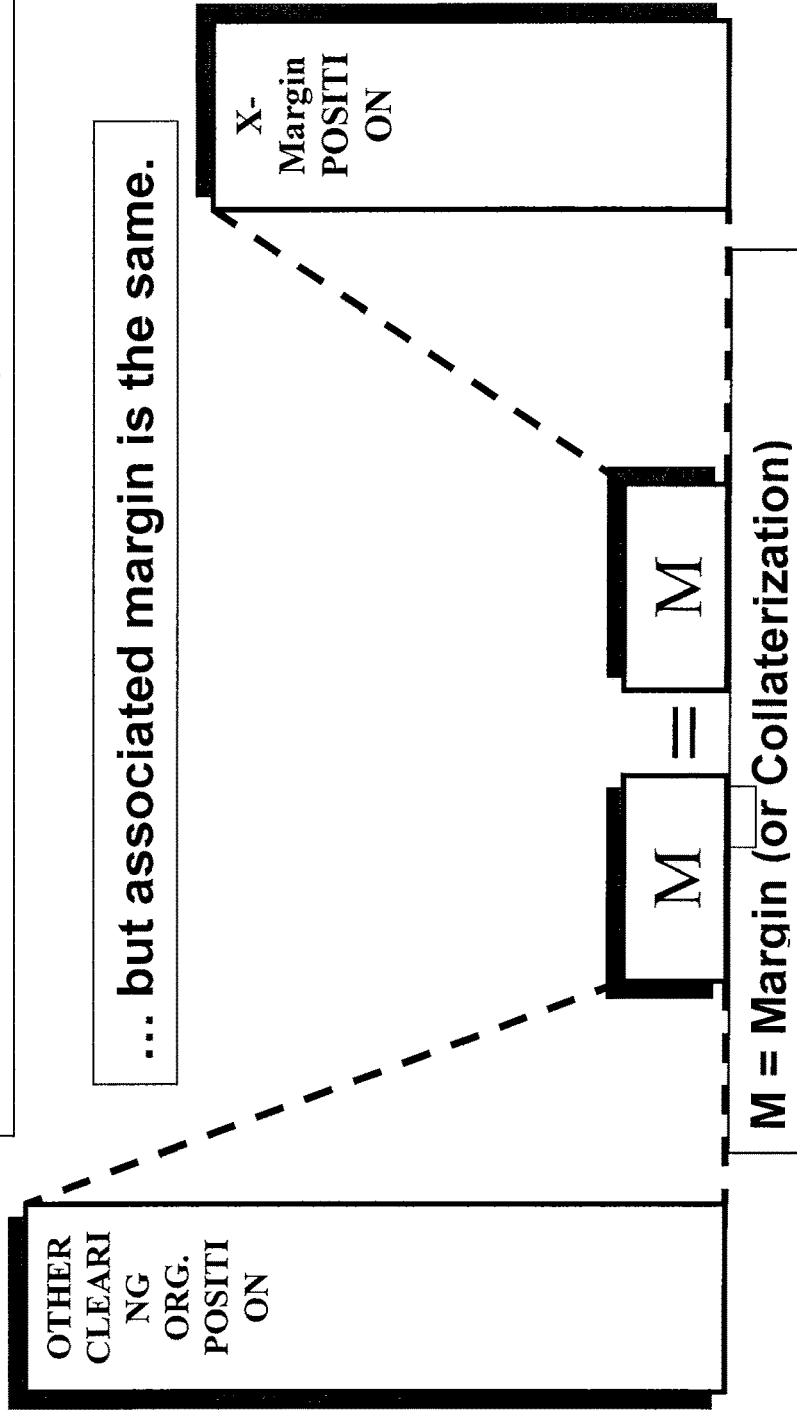

HYBRID CROSS-MARGINING

REFERENCE TO RELATED APPLICATIONS

This application is a continuation under 37 C.F.R. § 1.53(b) of U.S. patent application Ser. No. 12/858,911 filed Aug. 18, 2010 now U.S. Pat. No. 7,930,245, which is a continuation of U.S. patent application Ser. No. 11/452,673 filed Jun. 14, 2006 now U.S. Pat. No. 7,801,810, which claims the benefit of the filing date under 35 U.S.C. § 119(e) of U.S. Provisional Application Ser. No. 60/738,246 filed Nov. 18, 2005, the entire disclosures of which are hereby incorporated by reference.

BACKGROUND

Typically, an Exchange, such as the Chicago Mercantile Exchange ("CME"), provides a "clearing house" which is a division of the Exchange through which all trades made must be confirmed, matched and settled each day until offset or delivered. The clearing house is an adjunct to the Exchange responsible for settling trading accounts, clearing trades, collecting and maintaining performance bond funds, regulating delivery and reporting trading data. Clearing is the procedure through which the Clearing House becomes buyer to each seller of a futures contract, and seller to each buyer, and assumes responsibility for protecting buyers and sellers from financial loss by assuring performance on each contract. This is effected through the clearing process, whereby transactions are matched. A clearing member is a firm qualified to clear trades through the Clearing House. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

The Clearing House establishes clearing level performance bonds (margins) for the products of the Exchange and establishes minimum performance bond requirements for customers of Exchange's products. A performance bond, also referred to as a margin, is the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

Exchanges, such as, CME, derive their financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. Debt obligations from option contracts are also immediately removed, since the purchaser of an option must pay the premium (cost of the option) in full at the time of purchase. Sellers of options post performance bonds, discussed above, as determined by the Exchange according to the prevailing risk characteristics of the options sold. In the case of the CME, each business day by 6:40 a.m. Chicago time, based on the mark-to-the-market of all open positions to the previous trading day's settlement price, the Clearing House pays to or collects cash from each clearing member. This cash flow, known as settlement variation, is performed by CME's settlement banks based on instructions issued by the Clearing House. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the Clearing House has the authority to perform additional intra-day mark-to-the-market calculations on open positions and to call for immediate payment of settlement variation. Settlement variation payments through the Clearing House average $1.4 billion per day and have reached a peak of $6.4 billion. CME's mark-to-the-market settlement system stands in direct contrast to the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

If a clearing member does not have sufficient performance bond collateral on deposit with the Clearing House, then the clearing member must meet a call for cash performance bond deposits by 6:40 a.m. and/or by 2:00 p.m. Chicago time, which results in a direct debit to the clearing member's account at one of CME's settlement banks.

In order to minimize risk to the Exchange while minimizing the burden on members, it is desirable to approximate the requisite performance bond or margin requirement as closely as possible to the actual positions of the members at any given time. Accordingly, there is a need to improve the accuracy and flexibility of the mechanisms which estimate performance bond requirements.

BRIEF DESCRIPTION OF THE DRAWINGS

FIGS. 4A-4G depict block diagrams of a Flexible Hybrid Central Counter-party Cross-Margining or Cross Collateralization system according to one embodiment.

DETAILED DESCRIPTION

Figure 1:
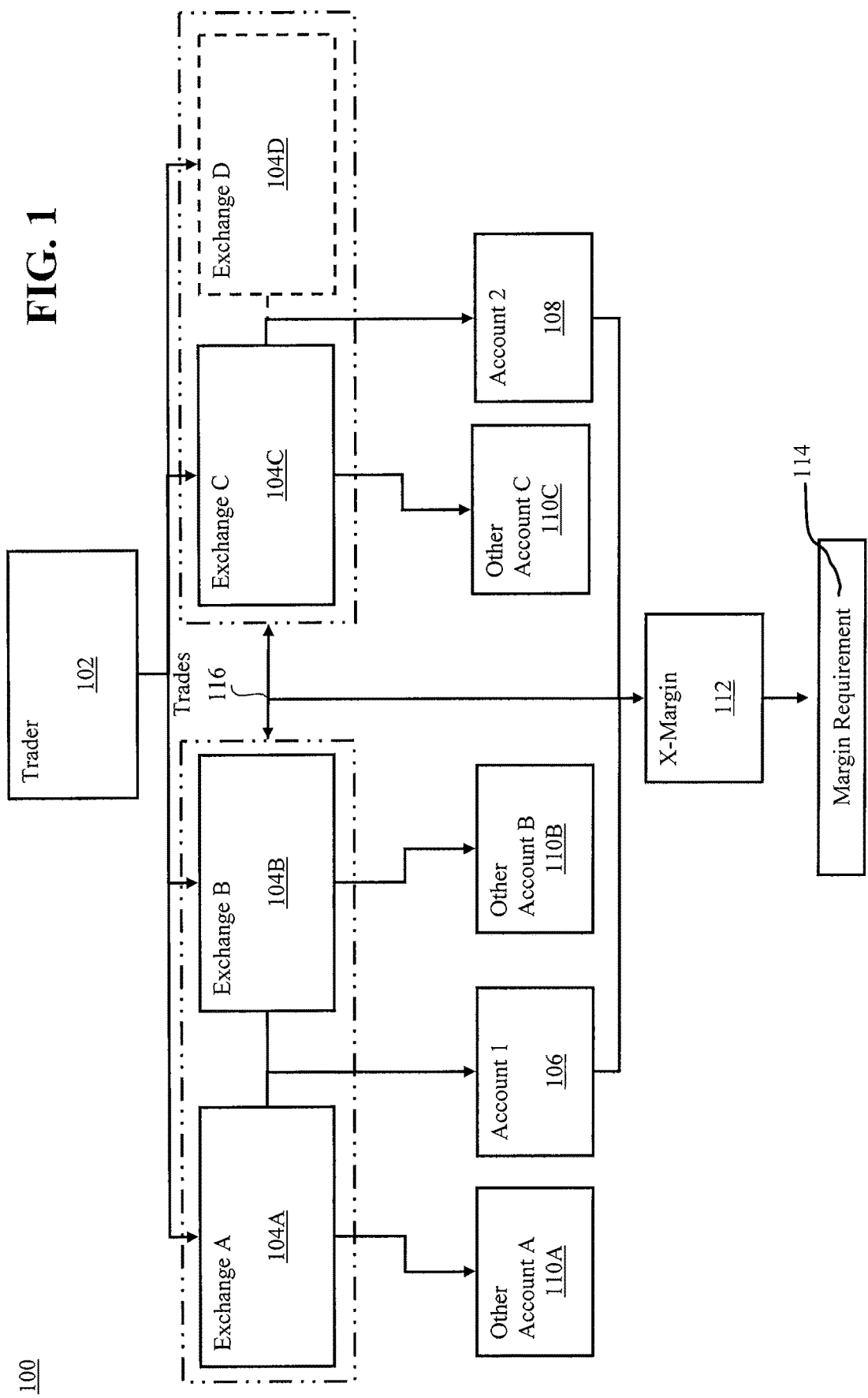
FIG. 1 depicts a block diagram of one embodiment of the disclosed hybrid cross margining system.

While the disclosed embodiments will be described in reference to the CME, it will be appreciated that these embodiments are applicable to any Exchange, including those which trade in equities and other securities. To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Cross-margining is a method of offsetting risk among multiple exchanges which recognizes that a given market participant, e.g. a trader, may have offsetting positions at more than one exchange. For the various positions held by the market participant, each exchange has its own margin requirements based on the participant's positions held at that exchange which recognize offsetting positions therein. However, as each exchange is a separate entity which independently tracks and accounts for positions, the market participant is required to satisfy the margin requirements of each exchange separately. The separation of exchanges may be due to myriad of business and regulatory considerations. These margin requirements may present a significant burden on the market participant, as has been described. Cross-margining mechanisms may be used to provide a way to recognize offsetting positions across exchanges, potentially resulting in a lower overall margin burden on the market participant, while satisfying the needs of the participating exchanges to minimize the risk of loss. Cross-margining mechanisms are typically implemented by contractual agreements between exchanges. These agreements provide rules as to how margin requirements will be determined and how each participating exchange will receive their apportioned amount of the overall margin requirement of the market participant. As will be described, these rules may specify or lend themselves to implementation via communications links between the exchanges and logic which monitors transactions and accounts and performs the requisite determination of the overall margin requirement for the market participant, thereby directing the flow of margin payments, appropriately apportioned, to each participating exchange to satisfy the individual margin requirements.

Generally, market participants trade products at multiple exchanges, including products which may have some form of correlation as to the risk of loss, e.g. a spread such as long and short positions on the same commodity. Where the products are traded on the same exchange, the risk management mechanisms of the exchange would recognize this "marginable" correlation in the computation of the margin requirement, offsetting one position against the other and, thereby, reducing the margin requirement for the market participant. Where the products are traded on different exchanges, the disclosed cross-margining mechanisms attempt to recognize the marginable correlation as will be described.

One method of cross-margining, referred to as the "one bucket" or "one pot" approach or model, relies on a joint account created specifically for cross-margining among two or more exchanges, the joint account being maintained separately from exchange-exclusive accounts and reflecting positions resulting from trades of products from any of the participating exchanges. For example, in recognition of the growing linkages among the markets for exchange-traded equity derivative products, as well as the need to promote efficient clearing procedures and to focus on the true inter-market risk exposure of clearing members, CME, in conjunction with other exchanges, such as the Options Clearing Corporation (OCC) and the New York Clearing Corporation (NYCC), has developed a cross-margining system with respect to market professionals and proprietary accounts. Cross-margining allows participating clearing corporations to recognize Clearing Members' inter-market hedges across the respective products they clear. By combining the positions of joint or affiliated clearing members in certain broad-based equity index futures and options into a single portfolio, and utilizing the sophisticated risk-based systems of each clearing organization, a single performance bond requirement across both markets is determined. Participating clearing corporations work together to the benefit of the Clearing Members. The clearing organizations jointly hold a first lien on and security interest in the positions in cross-margined accounts. All performance bond deposits associated with these accounts are jointly held. The cross-margining system significantly enhances both the efficiency and financial integrity of the clearing system by treating all positions as being held in the same account, which allows gains accruing to futures or options positions to be immediately available to meet the requirements for funds from losing positions. This system utilizes a risk-based portfolio methodology. The system is derived from the actual risk of inter-market hedged positions after combining Clearing Members' related options and futures positions and reduces participating Clearing Members' combined margin requirements, if hedged. Further, the system provides for greater liquidity through net settlements, enhances the financial integrity of participating clearing organization's clearance and settlement systems and reduces systematic risk. In the event that a clearing organization suspends a cross-margining member, the positions in the cross-margin accounts would be liquidated and all performance bond collateral would be converted to cash and applied toward each clearing organization's costs of liquidating the cross-margin accounts. CME, the OCC and the NYCC are each entitled to proportional shares of any surplus to apply toward other obligations of the clearing member; if one clearing organization did not need its entire share of the surplus, the excess would be made available to the other clearing organizations.

The joint account of the one bucket model results in immediate position netting which prevents the participant from maintaining spreads with other products, not included in the cross-margining system, provided by the individual exchanges, i.e. spread eligible positions are isolated and the participants, with respect to the joint account, are limited to trading specific products that the participating exchanges agree to cross margin and other products cannot be mixed in.

In the one bucket model, exchanges agree to create a special single joint account in which the correlated products of the various exchanges are traded by the market participant, i.e. the account reflects positions resulting from trades in products at the participating exchanges which have a marginable correlation. This joint account has its own margin requirement. From the market participant's perspective, there exists a single account for margins (money movement) and trades (transaction records, etc.), i.e. a virtual exchange. In such a model, any offsetable positions at the two locations/exchanges get forced into one account and all nettable positions are immediately recognized. Each exchanges' own internal risk-offsetting spreads are avoided because the individual positions (eligible for cross margining) are isolated into the joint account and taken away. This has the effect of concentrating risk offsets of two separate exchanges and maximizes risk offsets.

Another method of cross-margining, referred to as the "two bucket" or "two pot" approach or model, relies on an agreement among participating exchanges to recognize offsetting positions between the individual accounts maintained by each participating exchange. For example, CME also maintains other cross-margin agreements with other Exchanges, such as the London Clearing House and Fixed Income Clearing Corporation. These programs may involve the cross-margining of selected interest rate products. The design of these two cross-margin programs differ from the above mentioned OCC/NYCC program in that performance bond collateral is held separately at each respective clearing organization. As opposed to the one bucket model, the two bucket model recognizes all internal exchange spreads first before looking across exchanges. In the event that a clearing organization suspends a CME/LCH cross-margining participant, the cross-margined positions would be liquidated and performance bond collateral would be converted to cash at each respective clearing organization. If as a result of the liquidation of cross-margined positions and performance bond there is a resulting cross-margin loss, there will be a cross-margin guarantee payment from one clearing organization to the other to share the loss. A similarly structured cross-margin program is in place between CME and NYMEX for NYMEX energy products versus CME's commodity index complex.

In the two bucket model, there is no joint account as in the one bucket model. Instead, the exchanges agree to recognize risk offsets off of their own accounts. Accordingly, the market participant still has multiple accounts, but their margin requirements at each exchange are adjusted based on the exchanges recognition of risk offsetting positions at the other exchanges. This results in less margin demand on the trader. In operation, exchange specific/internal spreads are recognized first and then offsets between the participating exchanges are recognized.

The benefit of the one bucket model is that it requires all delta position to be offset at 1 centralized location which translates to greater risk offsetting. This will use maximum available delta in the eligible positions for risk-offsetting. It brings more efficiency to highly correlated products/positions in a 1 bucket spreading model. In other words, the performance bond savings amount will be much greater than the 2 bucket model since the risk offset eligible deltas from two separate (or multiple) exchange/clearing organizations can be concentrated into 1 bucket without the normal process of their respective existing intra or inter-commodity spreads taking priority. Operationally, it is easier to maintain the risk offset rules and rates since the 1 bucket model works as one virtual centralized clearing system despite the fact that position deltas originate from two separate (or multiple) exchanges/clearing organizations.

The benefit of the two bucket model is the flexibility in managing the performance bond collateral policies compared to the 1 bucket model since the policy will be controlled by the respective exchanges based on their own business decisions. This avoids legal and operational complexities of establishing and maintaining joint margin accounts for two separate or multiple legal entities/exchanges/clearing organizations, Further, there is no significant operational impact to the participating clearing member firms since the entire 2 bucket cross-margin process is streamlined into its normal processing at the respective exchanges/clearing organizations.

Accordingly, the one bucket model offers greater efficiency and amount in savings of performance bond requirement. However, it is expensive to operate for all participants and may be legally complicated (especially dealing with international exchanges under different regulatory regimes). The two bucket model offers ease of execution/implementation, and is generally inexpensive to operate for all participants with the expense of much less savings and efficiency of performance bond requirement. Additionally, it may also be less legally complicated from regulatory perspective. In situations involving highly correlated products and the desire to recognize greater risk-offsets in exchange for operational complexities, the one bucket model is preferred. Alternatively, if the provision of some savings in the performance bond is preferred without incurring expensive operational and system implementation costs for both the users and providers, the two bucket approach is preferred.

While an exchange may elect to implement a 1 bucket model or a 2 bucket model with another exchange, the disclosed embodiments relate to a hybrid of the 1 and 2 bucket models. The disclosed hybrid cross-margining system handles participants that deal with more than two exchanges and consolidates the exchange space without requiring that the exchanges merge into a single organization. This may be useful, for example, in situations where all of the participating exchanges cannot join together as a single organization, such as for regulatory reasons. Further, the disclosed embodiments are applicable beyond futures to any markets that require any type of collateral movement or any type of variation/mark to market movement. Further, the disclosed embodiments are application to any instruments that can be converted to novation. i.e. permit the substitution of the clearing house for the opposite contracting party, and as long as they are correlated, they can be offset in this model.

In the disclosed hybrid cross margining system, the dedicated joint account (of the one bucket model) is augmented with flexibility to spread anything left over in the joint account against another exchange (as in two bucket model). Effectively, the disclosed embodiments create a virtual exchange which includes both one or more joint accounts and one or more inter-exchange risk offset recognition agreements. In calculating the overall margin requirement for the market participant, the positions in the joint accounts may be offset against each other first to the extent possible, and then inter-exchange risk offset is accounted for in any remaining un-netted positions. In an alternative embodiment, inter-exchange offsets may be accounted for first, with any un-netted positions then being offset against available positions within the joint account.

Figure 4A:
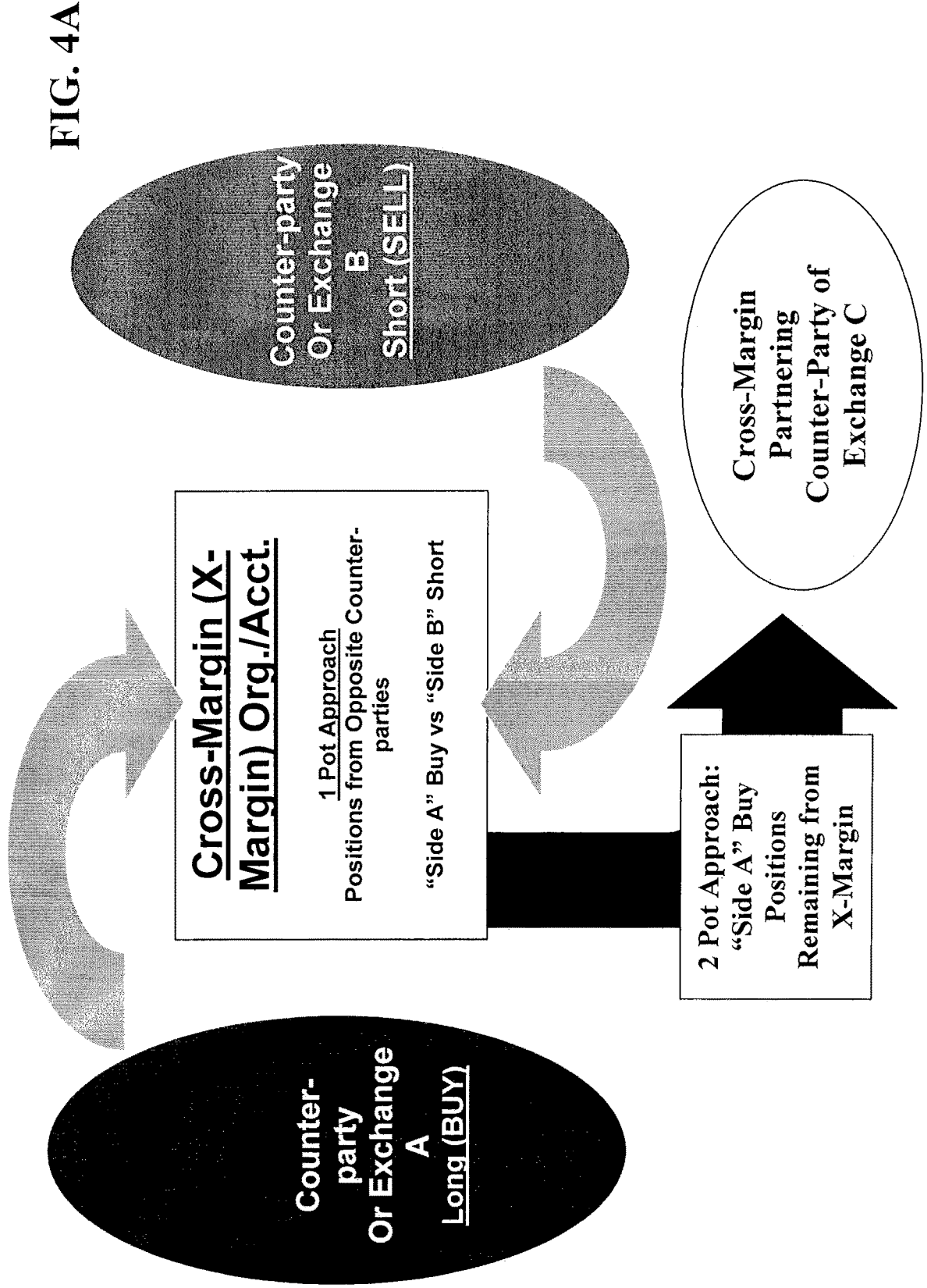

In one embodiment, shown in FIG. 4A, Flexible Hybrid Central Counter-party Cross-Margining or Cross Collateralization is supported. In particular, one-bucket and two-bucket cross-margining or collateralization processes are combined into a single streamlined process. Cross-Margining or Cross-Collateralization allows for a reduction in margin or collateral amount requirements for trading in either OTC or exchange traded derivatives markets. This reduction is possible because assessed risk is reduced when offsetting (risk-offset or 'Spreadable") positions are cleared by the same or affiliated "clearing members" or market participant firms at the cross-margin participating central-counterparty clearing organization(s).

In the present embodiment, both one-bucket and two-bucket cross-margining or collateralization processes are combined into a one streamlined and single process by combining 'One-pot Approach' and 'Two-pot Approach' to support both OTC and exchange traded derivatives clearing transactions. Process 1: 1 Pot Approach is initially achieved with two or multiple partnering parties. Process 2: 2 Pot Approach is achieved with one or multiple partnering parties dealing with risk-offset eligible positions after the process 1 is done.

Figure 4B:
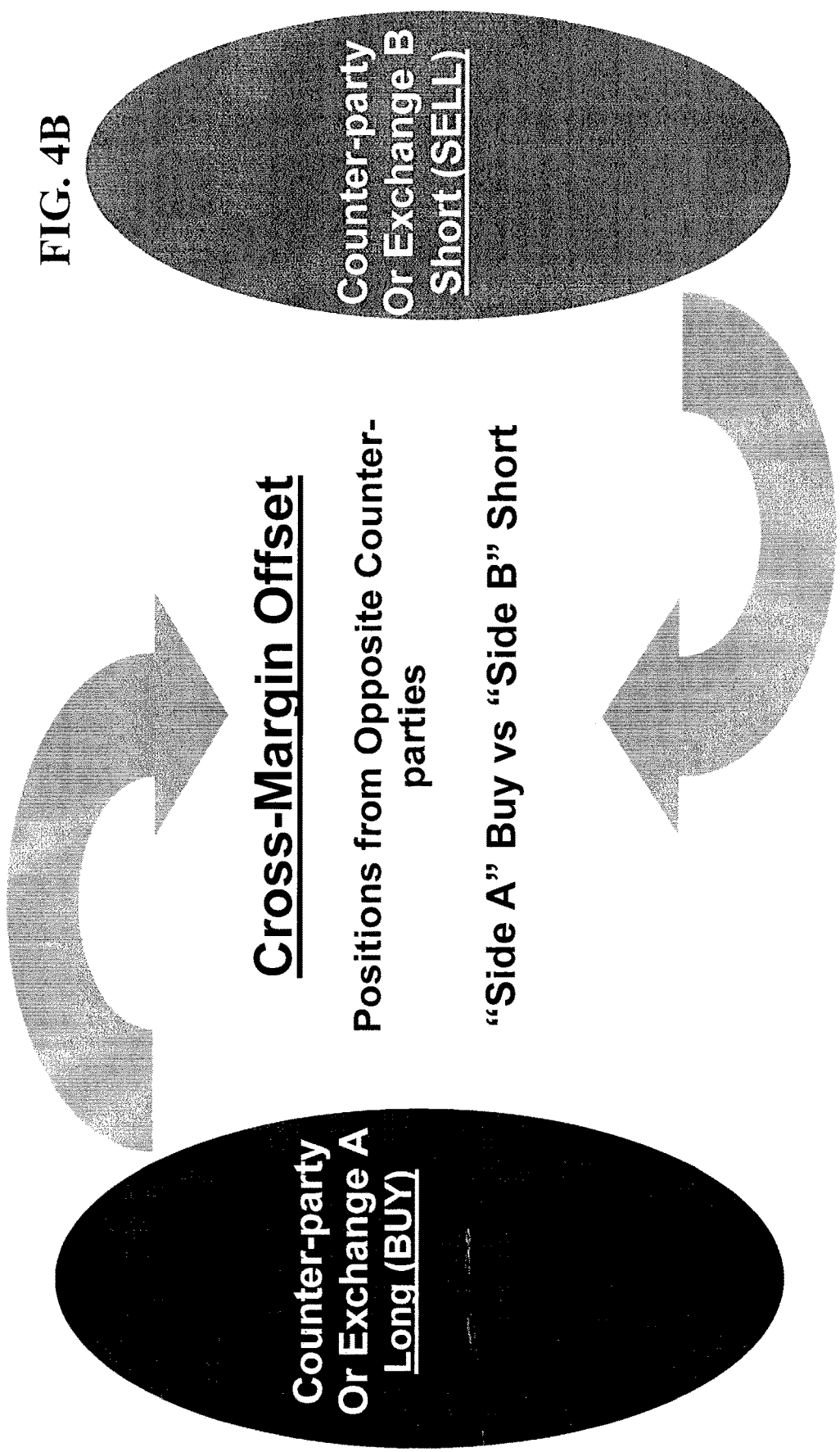
Figure 4C:
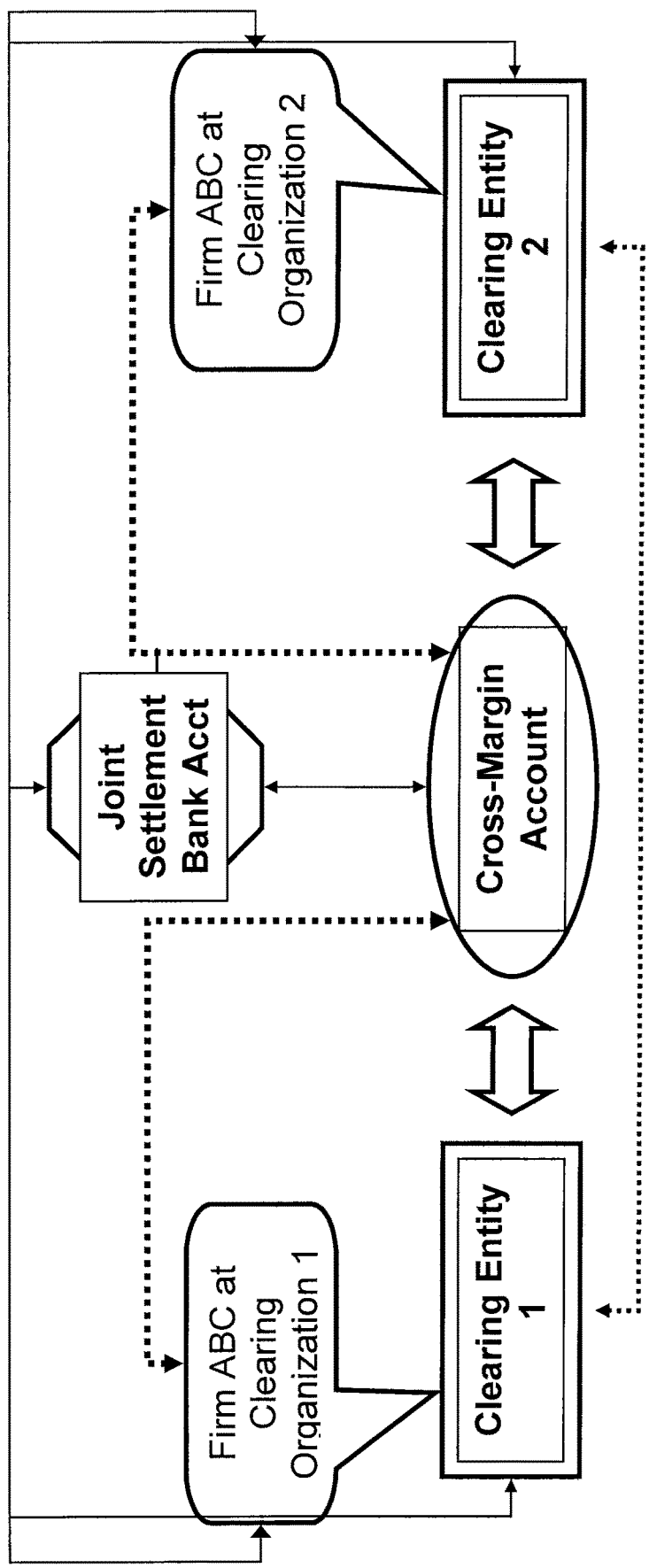
Figure 4D:
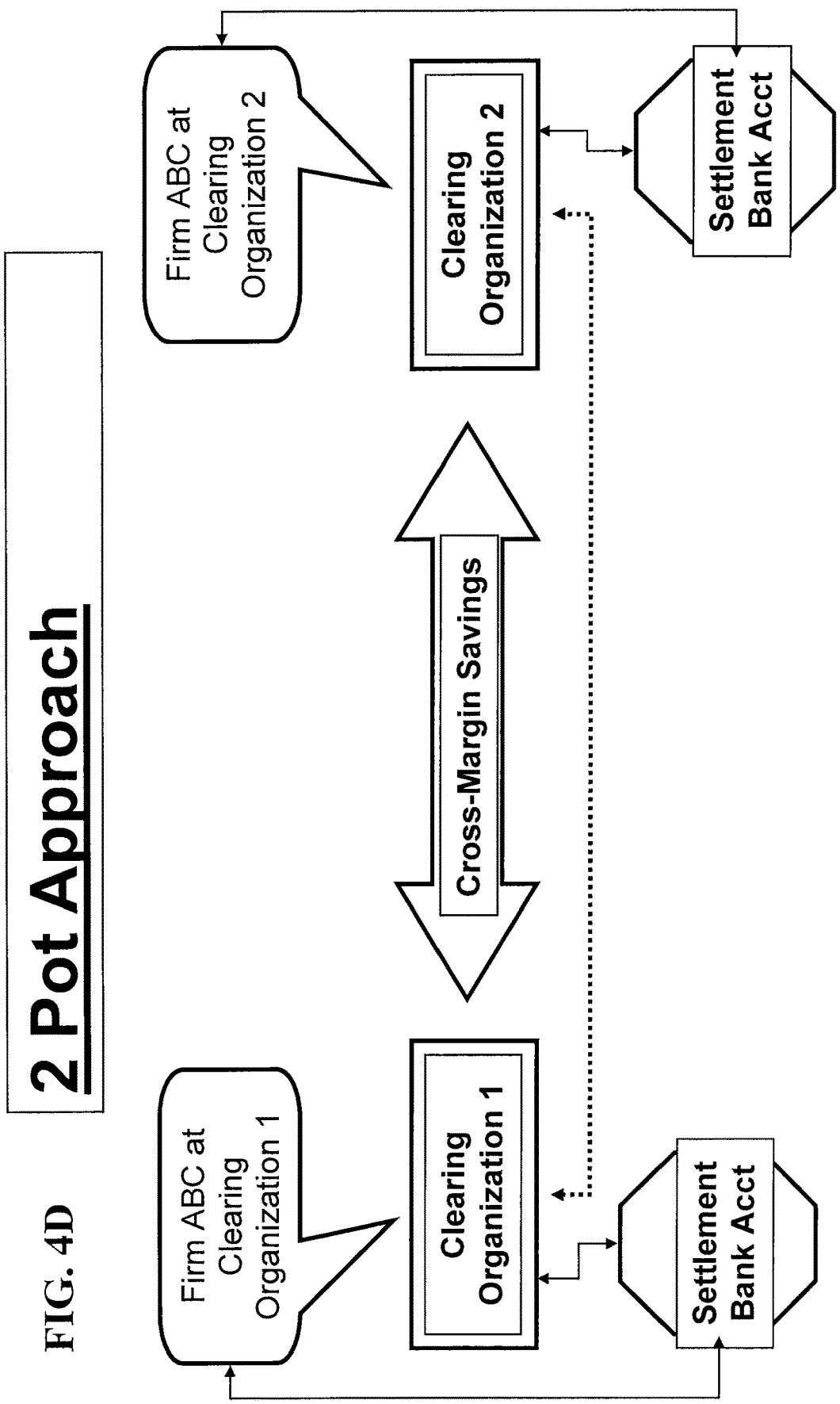

Referring to FIGS. 4B and 4C, the 1 Pot Approach is shown:
  Clearing Transactions Scope Participants: clearing members of exchange or counter-parties in the OTC market.
  Multiple contracts or products of all types (both OTC and exchange traded) at different exchanges or counter-parties.
  All Cross-Margin Activity=Joint Cross-Margin/collateral Account.
    Identified with a Separated into Cross-Margin Origin.
    It is separate from participant's normal clearing at respective clearing organizations, entities or counter-parties.
  Only ALLOW Cross-Margin/Collateral Eligible Trades to Clear in the Joint Cross-Margin/Collateral Accounts.
    Trades executed directly into the Cross-Margin Accounts.
    Positions can be transferred between a normal Clearing Account and Cross-Margin Clearing/Collateral Account.
    Separate Position Records/Data is submitted for the Cross-Margin process Origin.
  Banking Settlement or collateralization only Dedicated to the Joint Cross-Margin Accounts
    Treated as Separate Origin.
    Separate Bank Accounts, Wires, Transactions, etc.
Referring to FIG. 4D, the 2 Pot Approach is shown:
Transactions of Participating Clearing Organizations=Occurs at Each Clearing Org.+Offset Risk=2 Pot.
No Joint Cross-Margin Accounts
  No Separation from Clearing Member's Primary Clearing Account at respective clearing organizations.
  Hold Collateral in the Same Separate Firm Accounts.
Each Participating Organization Calculates its performance bond requirements, Offset and Share Offset, Gain & Loss Guarantee Information.
  Positions Remain at each participating organization origin.
  No Need for Position Transfer into Cross-Margin Account
  No Separate Position Change Submission (PCS) report is Needed
Transparent Transaction
  For example:
    CME offers credit on cross-margin eligible contracts for offsetting positions at the opposite clearing organizations Opposite Clearing Org. will offer credits on their positions.
  No Dedicated Banking Settlement for Cross-Margin Purposes
    No Separate Bank Accounts, Wires, Transactions, etc.
    Transactions become part of current banking transactions.

In the 2 Pot approach, Cross-Margin Offsets are Calculated as follows:
Internal Process for Cross-Margin Eligible Product:
1. Do all Internal Intra-Commodity Spreading.
2. Do all Internal Inter-Commodity Spreading.
3. Look at the available cross-margin delta positions at other clearing organizations to see if additional spreads could be formed from CME's remaining delta positions.
4. Allocate Prioritized Spread Credit to each Clearing Organization
  i.e. Multiple organization cross-margin program.
  Assign Priority from Highest to Lowest spread credit amounts based on the information from other participating clearing organizations.
  Calculate the Spread Allocation based on the priority.

Figure 4E:
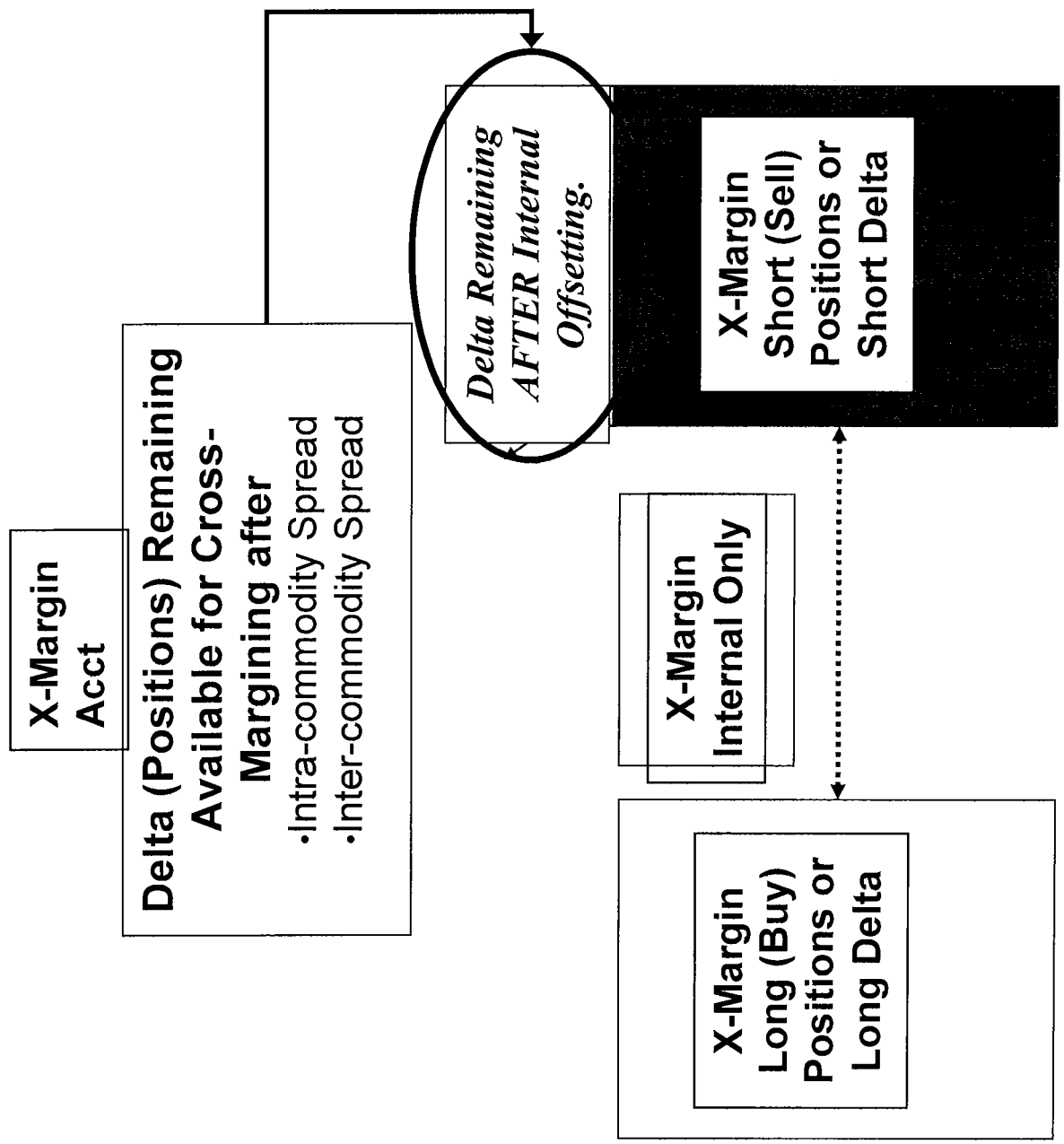
Figure 4F:
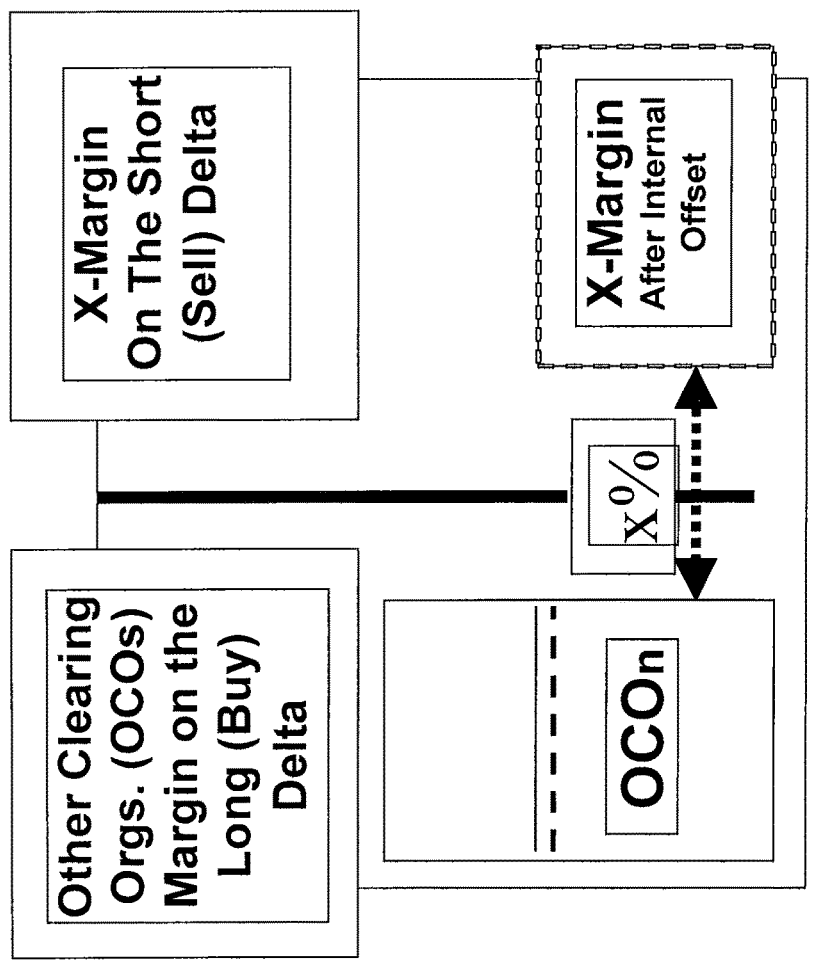

FIG. 4E shows the process for dealing with positions that were not originally offset. FIG. 4F shows how cross-margining utilizes X-margin margin that was not offset. FIG. 4G demonstrates how cross-margining matches positions of similar absolute risk at two or more clearing organizations.
  Allocation of Savings on Proportional Basis:
  Cross-Margining with Multiple Organizations,
    Allocation of its Positions and Margin necessary
    Allocations Will Optimize Members' Margin Reductions
    Amounts are First Allocated to Products With Best Correlations
    If Equally Correlated, Allocations Are Pro-Rata Based on Margin Amounts Submitted by Each Clearing Organization

|  | Exchange | | |
| --- | --- | --- | --- |
|  | CME | LCH | GSCC |
| Eligible Contract | Eurodollar | Euribor | Treasury Eq. |
| Eligible Delta | 1000 | −700 | −500 |
| Spread Credit % |  | 80% | 35% |
| Spreads Formed | 1000 | −700 | −300 |
| Remaining Delta | 0 | 0 | −200 |

The 2 pot approach offers the advantages of: flexibility in managing collateral is unaffected using "Two Pot" Approach; avoids legal and operational complexities of establishing and maintaining joint margin Accounts in a multiple-clearing organization cross margining environment; the ability to pledge margin collateral for liquidity purposes is unaffected; and there is no operational impact except in performing an audit trail.

Referring to FIG. 1, there is shown a block diagram of one embodiment of the disclosed hybrid cross margining system 100. In the disclosed system 100, a market participant, such as a trader 102, interacts with multiple exchanges 104A, 104B, 104C, 104D, e.g. places one or more orders for trades of the various products offered by the exchanges 104A, 104B, 104C, 104D. Each of the exchanges 104A, 104B, 104C, 104D maintains accounts 110A, 110B, 110C for the trader 102 which reflect the positions resulting from the execution of the trader's trades on the particular exchange 104A, 104B, 104C, 104D for the specified products. In general, these accounts 110A, 110B, 110C are specific/exclusive to the particular exchange 104A, 104B, 104C, 104D and do not reflect the transactions executed by the trader 102 at other exchanges 104A, 104B, 104C, 104D. Because these accounts 110A, 110B, 110C are maintained separately, the positions within each account 110A, 110B, 110C are typically not capable of being offset against positions in the other accounts 110A, 110B, 110C. According to one aspect of the disclosed embodiments, therefore, a joint account 106 is provided, by agreement of the exchanges 104A, 104B and the trader 102, which is capable of reflecting the trading activity of the trader 102 at multiple exchanges 104A, 104B, as was discussed above in relation to the one bucket model. As the various positions of the associated exchanges 104A, 104B are consolidated into a single account 106, any intra-account offsetting positions can be recognized to minimize the associated margin requirement for the account 106. It will be appreciated that the process of recognizing offsetting positions within the joint account may be performed continuously or at specified intervals, such as after the participating exchanges close for business on a given day. Continuous recognition of offsetting positions may be provided to allow the market participant to monitor their margin requirements as a function of their trading activity and make adjustments thereto if desired. Further, according to the disclosed embodiments, a relationship 116 is established between multiple exchanges 104A, 104B, 104C, 104D, such as between exchange A 104A, exchange B 104B and exchange C, 104C, for the purpose recognizing inter-exchange offsetting positions, as was discussed above for the two bucket model. This permits, for example, offsetting positions as between the joint account 106 and the account 108 maintained at the related exchange 104C. In an alternate embodiment, the account 108 may further be a joint account 108 itself which reflects positions resulting from trades at multiple exchanges 104C and 104D. It will be appreciated that the process of recognizing offsetting positions between accounts may be performed continuously or at specified intervals, such as after the participating exchanges close for business on a given day. Continuous recognition of offsetting positions may be provided to allow the market participant to monitor their margin requirements as a function of their trading activity and make adjustments thereto if desired. In one embodiment, cross-margining mechanisms 112 recognize intra-account offsetting positions first and then inter-exchange offsetting positions. This results in the determination of an overall margin requirement 114. In an alternate embodiment, the cross-margining mechanisms 112 recognize inter-exchange offsetting positions first and then intra-account positions to determine the overall margin requirement 114. In each embodiment, the un-netted balance of positions which are not completely offset via the first offsetting mechanism may be then offset via the second offsetting mechanism. Thereby, the disclosed hybrid cross-margining system further minimizes the requisite margin requirement by recognizing additional offsetting positions which otherwise would not be available. Where each account 106, 108 may have a particular margin requirement, the overall margin requirement 114 computed by the disclosed embodiments will not be more than the sum of the individual margin requirements, assuming no inter-exchange offsetting positions are available. It will be appreciated that the number of exchanges which may be related via either the joint account (one bucket) or the inter-exchange agreement (two bucket), is not limited, and may vary based on implementation with respect to the exchanges 104A, 104B, 104C, 104D and/or with respect to the trader 102. For example, different traders 102 or different exchanges 104A, 104B, 104B, 104D may have different agreements in place specifying different parameters or participating exchanges for the joint accounts and/or inter-exchange relationships. It will be appreciated that the process of determining the overall margin requirement may be performed continuously or at specified intervals, such as after the participating exchanges close for business on a given day. Continuous determination of the overall margin requirement may be provided to allow the market participant to monitor their margin requirements as a function of their trading activity and make adjustments thereto if desired, despite that the actual margin requirement expected to be met by the market participant is determined at a particular time.

Figure 2:
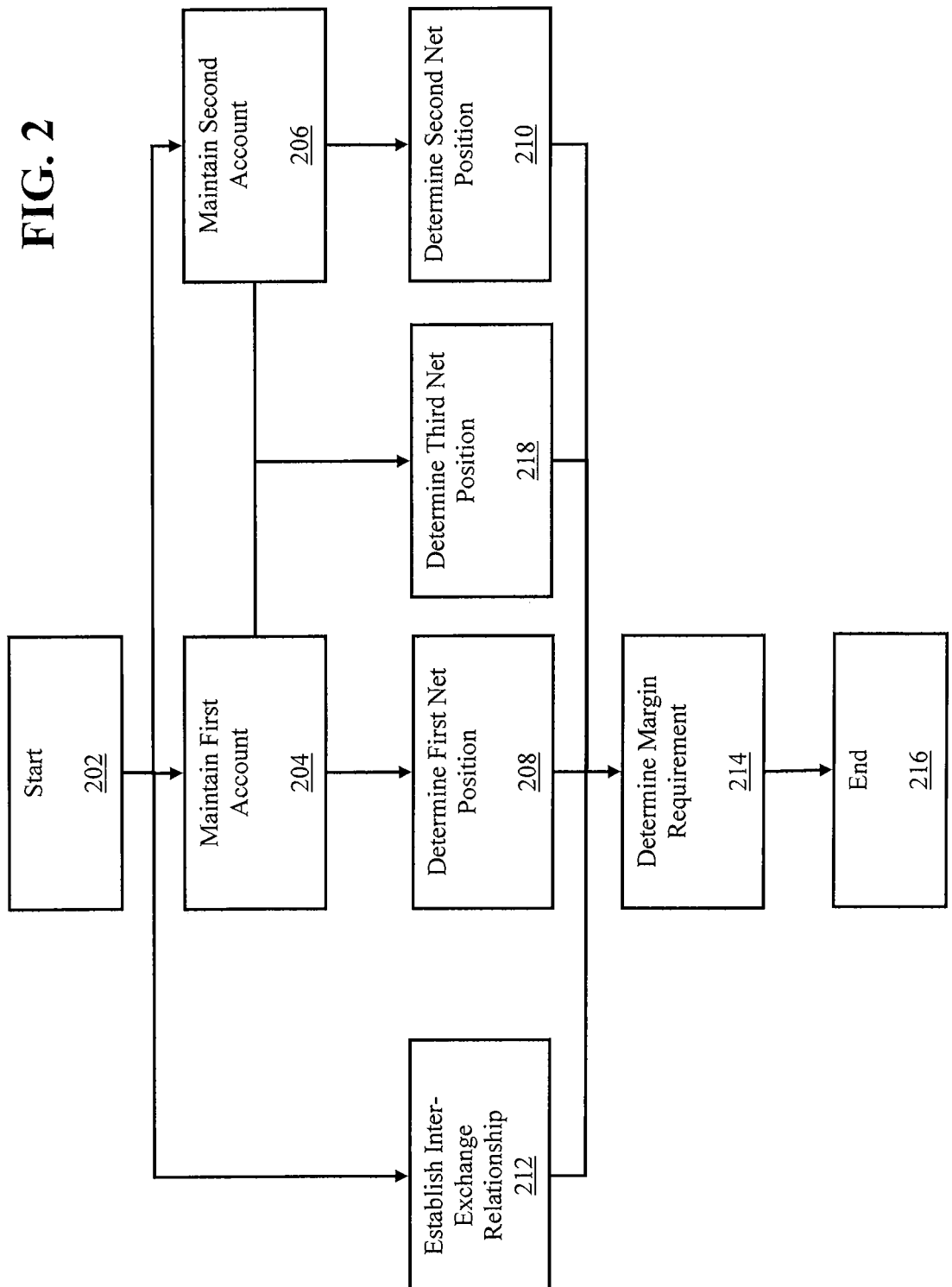
FIG. 2 depicts a flow chart showing operation of the disclosed hybrid cross margining system.

FIG. 2 depicts a flow chart showing operation 200 of the disclosed hybrid cross margining system. In operation, the disclosed system determines a minimal margin requirement 114 for a market participant, such as a trader 102. The process 200 includes maintaining, by a first exchange 104A and a second exchange 104B different from the first exchange, a first account 106 for the market participant 102 (block 204). It will be appreciated that additional exchanges may also be included as described. The first account 106 reflects a first plurality of positions resulting from a first one or more trades executed on the first exchange 104A for one or more products available from the first exchange 104A, a second one or more trades executed on the second exchange 104B for one or more products available from the second exchange 104B, or combinations thereof. As the first account 106 reflects positions from both the first and second exchanges 104A, 104B, it may be referred to as a joint account. The first account 106 is maintained separately from other accounts 110A maintained by the first exchange 104A which are only capable of exclusively reflecting positions resulting from trades executed by the first exchange 104A. The first account 106 is further maintained separately from other accounts 110B maintained by the second exchange 104B which are only capable of exclusively reflecting positions resulting from trades executed by the second exchange 104B. In one embodiment, at least a subset of the first and second plurality of positions are characterized by a marginable correlation. Alternatively, the first account 106 may be limited to reflecting positions resulting from cross-margin eligible trades. To the market participant 102, the first account appears to be maintained by a virtual exchange comprised of the participating individual exchanges 104A, 104B. While the first account 106 is maintained separate from other accounts 110A, 110B at the exchange, in one embodiment, the market participant 102 is permitted to transfer one or more of the first plurality of positions to one of the other accounts 110A, 110B maintained by the first exchange 104A or the second exchange 104B.

The process 200 continues with determining a first net position based on the first plurality of positions reflected in the first account 106 (block 208) by recognizing intra-account offsetting positions, such as intra-commodity spreads and/or inter-commodity spreads.

Further, the process 200 includes maintaining, by a third exchange 104C, a second account 108 for the market participant 102 (block 206). The second account 102 reflects a second plurality of positions resulting from a third one or more trades executed on the third exchange 104C for one or more products available from the third exchange 104C. In one embodiment, the third exchange 104C is different from first and second exchanges 104A, 104B. In an alternative embodiment, the third exchange 104C may be the same as one of the first and second exchanges 104A, 104B, wherein the second account 108 comprises one of the separate other accounts 110A or 110B held by the market participant 102. In an alternative embodiment, the second account 108 may further be a joint account, i.e. the second account 108 is further maintained by a fourth exchange 104D. In this embodiment, the second plurality of positions further includes positions resulting from a fourth one or more trades executed on the fourth exchange 104D for one or more products available from the fourth exchange 104D. Further, similar to the first account 106, the second account 108 is maintained separately from other accounts 110C maintained by the third exchange 104C which are only capable of exclusively reflecting positions resulting from trades executed by the third exchange 104C and the second account 108 is maintained separately from other accounts (not shown) maintained by the fourth exchange 104D which are only capable of exclusively reflecting positions resulting from trades executed by the fourth exchange 104D.

According to the process 200, a second net position is determined based on the second plurality of positions reflected in the second account 108 (block 210) by recognizing intra-account offsetting positions, such as intra-commodity spreads and/or inter-commodity spreads. The second net position may be determined before, after or concurrently with the determination of the first net position.

Further, a third net position is determined based on the first plurality of positions reflected in the first account and the second plurality of positions reflected in the second account (block 218) via recognition of the inter-exchange offsetting positions, such as intra-commodity spreads and/or inter-commodity spreads. The third net position may be determined prior to, subsequent to or concurrently with the first and/or second net positions. Where the determining of the first or second net positions may result in un-netted positions, the determining of the third net position may further include netting these un-netted positions.

The process 200 further includes establishing a relationship 116 between the participating exchanges 104A, 104B, 104C, 104D (block 212) and, optionally, the market participant 102. This relationship may be established via contractual agreement and may be established in advance of, or concurrently with, the process by which the minimal margin requirement 114 is computed. In one embodiment, the relationship defines the parameters by which the margin require is determined, e.g. which exchanges 104A, 104B, 104C, 104D may participate, what products are eligible, which accounts 106, 108 are eligible, how are offsetting positions recognized and in what order as to intra-account and inter-exchange recognition.

Finally, based on the established relationship, and the first, second and third net positions, the minimal margin requirement 114 is determined for the market participant 102 (block 214). This is the amount, allocated to each participating exchange 104A, 104B, 104C, 104D, that the market participant 102 must post to cover the risk of loss created by the various positions held in the accounts 106, 108. The computation of the minimal margin requirement may include determining a first margin requirement for the first account 106, based on intra-account offsetting and the determining a second margin requirement, based on intra-account offsetting, for the second account 108, wherein the minimal margin requirement is not more than the sum of the first and second margin requirements, since additional inter-exchange offsetting may be available. Alternatively, as was discussed, inter-exchange offsets may be recognized before intra-account offsets.

Figure 3:
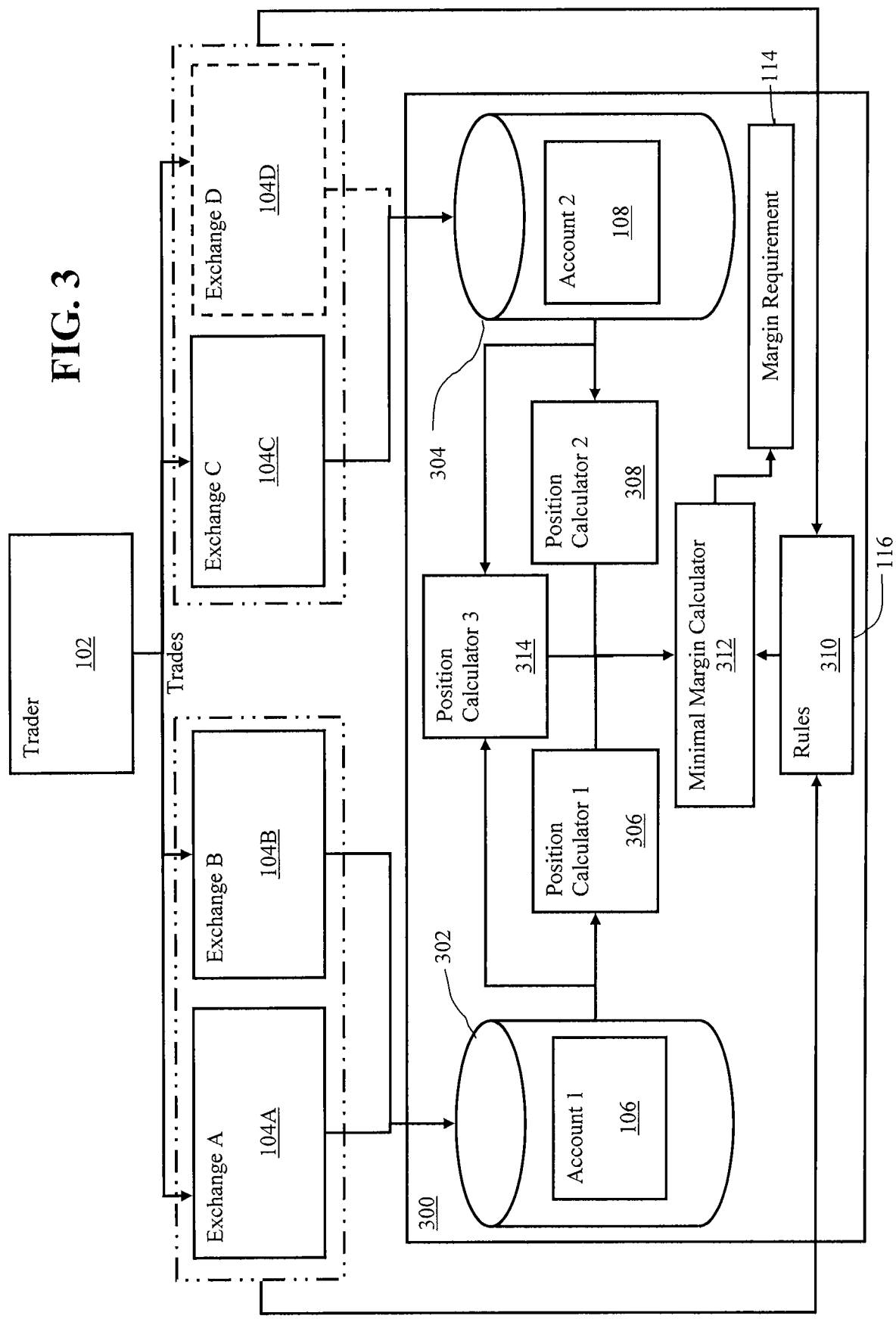
FIG. 3 depicts a block diagram showing an exemplary implementation of the system of FIG. 1.

FIG. 3 depicts a block diagram showing an exemplary implementation of the system of FIG. 1. The system 300 may be implemented in one or more computer systems, including one or more processors, memories and suitable software, interconnected with the systems of the participating exchanges 104A, 104B, 104C, 104D via suitable communications links, which may include wired or wireless connections, or combinations thereof. In one embodiment, the various components described herein are implemented in hardware, software or a combination thereof, such as logic stored in a memory and executable by one or more processors to implement the requisite functionality. It will be appreciated that one or more of the components of the system 300 may be maintained by one or more of the participating exchanges 104A, 104B, 104C, 104D or by a third party, and suitable interconnected as described above. Further, components maintained by a particular exchange 104A, 104B, 104C, 104D may be integrated with. or separate from, the exchange's 104A, 104B, 104C, 104D other systems. For example, the various accounts for use with the disclosed embodiments may be maintained by a particular exchange 104A, 104B, 104C, 104D as part of their normal accounts database or they may be maintained in a separate database.

The system 300 for determining a minimal margin requirement 114 for a market participant 102 includes a first account 106, stored in a first database 302 and maintained for the market participant 102 by a first exchange 104A and a second exchange 104B different from the first exchange 104A. In one embodiment, the first account 106 includes a data structure which stores all of the account parameters and permits review and modification of those parameters. The first account 106 reflects, i.e. stores data reflecting, a first plurality of positions resulting from a first one or more trades executed on the first exchange 104A for one or more products available from the first exchange 104A, a second one or more trades executed on the second exchange 104B for one or more products available from the second exchange 104B, or combinations thereof. As the account 107 reflects positions generated from more than one exchange 104A, 104B, the account 107 maybe referred to as a joint account. The first account 106 is maintained separately, e.g. in a separate database or data structure, from other accounts 110A maintained by the first exchange 104A which are only capable of exclusively reflecting positions resulting from trades executed by the first exchange 104A. The first account 106 is further maintained separately from other accounts 110B maintained by the second exchange 104B which are only capable of exclusively reflecting positions resulting from trades executed by the second exchange 104B. The system 300 is further coupled with the participating exchanges 104A, 104B, 104C, 104D so as to be able to access account information and receive data regarding account positions resulting from trades executed by market participant 102. Herein, the phrase "coupled with" is defined to mean directly connected to or indirectly connected through one or more intermediate components. Such intermediate components may include both hardware and software based components. In one embodiment, the system 300 is coupled with the exchanges 104A, 104B, 104C, 104D via a network, such as a wired network, wireless network, or combination thereof. Further, the exchanges 104A, 104B, 104C, 104D, may include an application program interface ("API") coupled with the network which facilitates the requisite data access. In one embodiment, the system 300 includes first logic, such as database management logic and associated data structures, stored in a first memory and executable by a first processor, coupled with the first memory to maintain the first account 106 for the market participant 102. As described above, the joint accounts of the disclosed embodiments are maintained separately from the non-joint accounts, however, a position transmitter (not shown) may be provided which is operative to allow a market participant to transfer one or more of the first plurality of positions to one of the other accounts maintained by the first exchange or the second exchange.

The system 300 further includes a first net position calculator 306 coupled with the first database 302 and operative to determine a first net position based on the first plurality of positions reflected in the first account 106, such as by recognizing intra-commodity spreads and/or inter-commodity spreads. The first net position calculator 306 may b implemented as second logic, coupled with the first logic, stored in the first memory and executable by the first processor to determine the first net position as described. For example, the first net-position calculator 306 may include computer program logic operative to scan the data structure of a particular account and identify offsetting positions. Once identified the computer program logic of the first net-position calculator 306 computes the first net position based on the value of the identified offsetting positions found in the data structure. As was described above, the first net position calculator 306 may operate periodically or continuously to determine the first net position.

The system 300 also includes a second account 108, stored in a second database 304 and maintained by a third exchange 104C for the market participant 102, the second account 108 reflecting a second plurality of positions resulting from a third one or more third executed on the third exchange 104C for one or more products available from the third exchange 104C. In one embodiment, the second account 108 includes a data structure which stores all of the account parameters and permits review and modification of those parameters. In one embodiment, the system 300 may further include third logic stored in a second memory, such as database management logic and associated data structures, and executable by a second processor to maintain the second account 108. In one embodiment, the third exchange 104C is different from first and second exchanges 104A, 104B. In an alternative embodiment, the third exchange 104C may be the same as the first or second exchange 104A, 104B as was described above.

In one embodiment, the second account 108 is also a joint account similar to the first account 106 wherein the second account 108 is further maintained by a fourth exchange 104D, the second plurality of positions further including positions resulting from a fourth one or more trades executed on the fourth exchange 104D for one or more products available from the fourth exchange 104D. As for the first account 106, the second account 108 is maintained separately from other accounts 110C maintained by the third exchange which are only capable of exclusively reflecting positions resulting from trades executed by the third exchange 104C and the second account 108 is maintained separately from other accounts (not shown) maintained by the fourth exchange 104D which are only capable of exclusively reflecting positions resulting from trades executed by the fourth exchange 104D.

The system 300 further includes a second net position calculator 308 coupled with the second database 304 and operative to determine a second net position based on the second plurality of positions reflected in the second account 108, such as by recognizing intra-commodity spreads and/or inter-commodity spreads. In one embodiment, the second net position calculator 308 may be implemented as fourth logic, coupled with the third logic, stored in the second memory and executable by the second processor to determine the second net position. In one embodiment, the first net position calculator 306 and second net position 308 calculator are further operative to determine the first and second net positions prior to the third net position calculator 314 determining the third net position, as will be further described below. For example, the second net-position calculator 308 may include computer program logic operative to scan the data structure of a particular account and identify offsetting positions. Once identified the computer program logic of the second net-position calculator 308 computes the second net position based on the value of the identified offsetting positions found in the data structure. As was described above, the second net position calculator 308 may operate periodically or continuously to determine the second net position.

The system 300 also includes a third net position calculator 314 coupled with the first and second databases 302, 304 and operative to determine a third net position based on the first plurality of positions reflected in the first account 106 and the second plurality of positions reflected in the second account 108 by recognizing inter-exchange offsettable positions in the accounts 106, 108. In one embodiment, the third net position calculator 314 may in implemented as fifth logic, coupled with the first logic and the third logic, stored in a third memory and executable by a third processor to determine the third net position. In one embodiment, as has been described, the intra-account offsets, as determined by the first and second net position calculators 306, 308 are computed prior to the computation of the inter-exchange offsets by the third net position calculator 314. In an alternative embodiment, inter-exchange offsets are recognized first. For example, wherein the first and second net position calculators 306, 308 may further determine one or more un-netted positions, the third net position calculator 314 may be further operative to net these un-netted positions. For example, the third net-position calculator 314 may include computer program logic operative to scan the data structures of a particular accounts and identify offsetting positions. Once identified the computer program logic of the third net-position calculator 314 computes the third net position based on the value of the identified offsetting positions found in the data structures. As was described above, the third net position calculator 314 may operate periodically or continuously to determine the third net position.

The system 300 further includes rules 310, defined, in one embodiment, by contractual agreement among the participating exchanges 104A, 104B, 104C, 104D, and, optionally, the market participant 102, to recognize offsetting positions therebetween. The third exchange 104C is coupled with at least one of the first and second exchanges 104A, 104B via the plurality of rules 310 thereby establishing a relationship 116 therebetween, the relationship being based on the plurality of rules 310. In one embodiment, sixth logic stored in at least one of the first memory, the second memory, the third memory, or combinations thereof, and executable by the at least one of the first processor, the second processor, the third processor, or combinations thereof, may implement the rules 310 establish the relationship 116 between the third exchange 104C and at least one of the first and second exchanges 104A, 104B. These rules 310 may, in part, define interface and data exchange protocols, such as an API, to allow intercommunication of the requisite data between and among the participating exchanges 104A, 104B, 104C, 104D to implement the disclosed cross-margining functionality.

The system 300 further includes a minimal margin calculator 312 coupled with the first, second and third net positions calculators 306, 308, 314 and operative to determine the minimal margin requirement 114 for the market participant 102 based on the first, second and third net positions and the relationship 116. In one embodiment, the minimal margin calculator 312 may be implemented as seventh logic, such as computer program logic including the requisite computations for calculating a margin requirement based on the various net positions determined above, coupled with the second logic, the fourth logic, the fifth logic and the sixth logic, stored in at least one of the first memory, the second memory, the third memory, or combinations thereof, and executable by the at least one of the first processor, the second processor, the third processor, or combinations thereof, to determine the minimal margin requirement for the market participant 102. In one embodiment, wherein the first net position calculator 306 is further operative to determine a first margin requirement for the first account and the second net position calculator 308 is further operative to determine a second margin requirement for the second account, the minimal margin requirement 114 may not be more than the sum of the first and second margin requirements, due to further inter-exchange offsetting that may be available.

It will be appreciated that one or more of the processors, memories, logic and/or components described above may be combined or further sub-divided into discrete components thereof, and that all such implementations, accomplishing the disclosed functionality, are contemplated. Further, operation of the above components/functions may be performed on a periodic or batch basis, such as at the close of trading, and/or in real time continuously throughout the trading day or other window of time. Continuous operation would allow a market participant to monitor their margin requirements with respect to changes in their accounts.

In one embodiment, the disclosed embodiments may operate as follows, assuming three participating exchanges, the first two exchanges utilizing the one bucket model and the third exchange participating with the first two exchanges via the two bucket model: The one bucket model may be applied first, followed by the two bucket model with internal spreads in between. Assume, for this example, that a given market participant holds a long 10 position from a first exchange and short 15 position from a second exchange in their joint account. Executing the one bucket model first, the result is spread of 10 deltas with a delta remaining of short 5 at the second exchange. Next, internal spreads at the second exchange are applied. In particular, the second exchange takes the short 5 resulting from the application of the one bucket model and incorporates it into the second exchange's own internal spreading (intra or inter) processes. Assuming, the second exchange has a long 3 position it can spread against, this results in an internal intra/inter spread of 3 deltas for the second exchange and a delta remaining of short 2. Next, the two bucket model is applied. Assuming for this example that there are remaining 5 long deltas at a third exchange the are eligible for cross margin, the result of the application of the two bucket model is a spread of 2 deltas and a delta remaining of short 3 at the third exchange. Alternatively, the above scenario can be implemented by performing internal spreads at the respective participating exchanges/clearing organizations, followed by the two bucket model and then the one bucket model thereafter. Further, in yet other alternative implementations the one bucket model can be applied prior to the two bucket model, or vice versa, with internal spreads being skipped altogether.

It is therefore intended that the foregoing detailed description be regarded as illustrative rather than limiting, and that it be understood that it is the following claims, including all equivalents, that are intended to define the spirit and scope of this invention.

We claim:

1. A method, comprising:

maintaining, by first circuitry, a first account data structure, stored in a first database and further in a memory coupled with the first circuitry, for a market participant, the first account data structure storing data indicative of a first plurality of positions resulting from a first one or more trades executed by a first exchange and a second plurality of positions resulting from a second one or more trades executed by a second exchange, each position of the first and second plurality of positions being characterized by a risk of loss value, the first and the second plurality of positions having a first net position comprising a first resultant remainder as a result of netting of a subset of the risk of loss values characterizing each of the first and second plurality of positions according to a first set of rules which define a degree to which a risk of loss value of any one position may be offset by a risk of loss value of one or more other positions, the first account data structure being maintained separately from other account data structures stored in a second database maintained by the first exchange which are only capable of exclusively storing data indicative of positions resulting from trades executed on the first exchange, each of which is characterized by a risk of loss value, and the first account data structure being maintained separately from other account data structures stored in a third database maintained by the second exchange which are only capable of exclusively storing data indicative of positions resulting from trades executed on the second exchange, each of which is characterized by a risk of loss value;

maintaining, by second circuitry, a second account data structure stored in a fourth database and further in a memory coupled therewith for the market participant, the second account data structure storing data indicative of a third plurality of positions resulting from a third one or more trades executed on a third exchange, each of which is characterized by a risk of loss value, and the third plurality of positions having a second net position comprising a second resultant remainder as a result of netting of a subset of the risk of loss values characterizing each of the third plurality of positions according to a second set of rules which define a degree to which a risk of loss value of any one position may be offset by a risk of loss value of one or more other positions, the second set of rules different from the first set of rules; and determining, by third circuitry, a third net position comprising a third resultant remainder as a result of netting of a subset of the risk of loss values characterizing each of the positions in the first and second net positions according to a third set of rules different from the first and second set of rules, wherein the netting that results in the first net position and the netting that results in the second net position are performed prior to the determining of the third net position.

2. The method of claim 1, wherein the first account data structure comprises positions resulting from cross-margin eligible trades.

3. The method of claim 1, wherein the first circuitry, the second circuitry, and third circuitry are embedded in a device.

4. The method of claim 1, further comprising transferring, prior to any netting, one or more of the first plurality of positions to one of the other account data structures stored in the second database maintained by the first exchange.

5. The method of claim 1, wherein the determining of the second net position, further comprises recognizing intra-commodity spreads and inter-commodity spreads with respect to the third exchange.

6. The method of claim 1, wherein the third exchange is different from first and second exchanges.

7. A system, comprising:
first computer hardware configured to maintain a first account data structure, stored in a first database and further in a memory coupled with first circuitry, for a market participant,
the first account data structure storing data indicative of a first plurality of positions resulting from a first one or more trades executed by a first exchange and a second plurality of positions resulting from a second one or more trades executed by a second exchange, each position of the first and second plurality of positions being characterized by a risk of loss value,
the first and the second plurality of positions having a first net position comprising a first resultant remainder as result of netting of a subset of the risk of loss values characterizing each of the first and second plurality of positions according to a first set of rules which define a degree to which a risk of loss value of any one position may be offset by a risk of loss value of one or more other positions,
the first account data structure being maintained separately from other account data structures stored in a second database maintained by the first exchange which are only capable of exclusively storing data indicative of positions resulting from trades executed on the first exchange, each of which is characterized by a risk of loss value, and
the first account data structure being maintained separately from other account data structures stored in a third database maintained by the second exchange which are only capable of exclusively storing data indicative of positions resulting from trades executed on the second exchange, each of which is characterized by a risk of loss value;
second computer hardware configured to maintain a second account data structure stored in a fourth database and further in a memory coupled therewith for the market participant,
the second account data structure storing data indicative of a third plurality of positions resulting from a third one or more trades executed on a third exchange, each of which is characterized by a risk of loss value, and
the third plurality of positions having a second net position comprising a first resultant remainder as a result of netting of a subset of the risk of loss values characterizing each of the third plurality of positions according to a second set of rules which define a degree to which a risk of loss value of any one position may be offset by a risk of loss value of one or more other positions, the second set of rules different than the first set of rules; and
third computer hardware configured to determine a third net position comprising a first resultant remainder as a result of netting of a subset of the risk of loss values characterizing each of the positions in the first net position and the second net position according to a third set of rules different from the first and second set of rules,
wherein the netting that results in the first net position and the netting that results in the second net position are performed prior to the determining of the third net position.

8. The system of claim 7, wherein first account data structure comprises positions resulting from cross-margin eligible trades.

9. The system of claim 7, wherein the first computer hardware, the second computer hardware, and the third computer hardware each share hardware components.

10. The system of claim 7, further comprising transferring, prior to any netting, one or more of the first plurality of positions to one of the other account data structures stored in the second database maintained by the first exchange.

11. The system of claim 7, wherein the determining of the second net position, further comprises recognizing intra-commodity spreads and inter-commodity spreads with respect to the third exchange.

12. The system of claim 7, wherein the third exchange is different from first and second exchanges.

13. A system, comprising:
a first memory device executable by a processor to maintain a first account data structure, stored in a first database therein for a market participant,
the first account data structure storing data indicative of a first plurality of positions resulting from a first one or more trades executed by a first exchange and a second plurality of positions resulting from a second one or more trades executed by a second exchange, each position of the first and second plurality of positions being characterized by a risk of loss value,
the first and the second plurality of positions having a first net position comprising a first resultant remainder as a result of netting of a subset of the risk of loss values characterizing each of the first and second plurality of positions according to a first set of rules which define a degree to which a risk of loss value of any one position may be offset by a risk of loss value of one or more other positions,
the first account data structure being maintained separately from other account data structures stored in a second database maintained by the first exchange which are only capable of exclusively storing data indicative of positions resulting from trades executed on the first exchange, each of which is characterized by a risk of loss value, and
the first account data structure being maintained separately from other account data structures stored in a third database maintained by the second exchange which are only capable of exclusively storing data indicative of positions resulting from trades executed on the second exchange, each of which is characterized by a risk of loss value;

a second memory device executable by a processor to maintain a second account data structure stored in a fourth database therein for the market participant, the second account data structure storing data indicative of a third plurality of positions resulting from a third one or more trades executed on a third exchange, each of which is characterized by a risk of loss value, and the third plurality of positions having a second net position comprising a first resultant remainder as a result of netting of a subset of the risk of loss values characterizing each of the third plurality of positions according to a second set of rules which define a degree to which a risk of loss value of any one position may be offset by a risk of loss value of one or more other positions, the second set of rules different than the first set of rules; and a third memory device executable by a processor to determine a third net position comprising a first resultant remainder as a result of netting of a subset of the risk of loss values characterizing each of the positions in the first net position and the second net position according to a third set of rules different from the first and second set of rules, wherein the netting that results in the first net position and the netting that results in the second net position are performed prior to the determine of the third net position.

14. The system of claim 13, wherein first account data structure comprises positions resulting from cross-margin eligible trades.

15. The system of claim 13, further comprising transferring, prior to any netting, one or more of the first plurality of positions to one of the other account data structures stored in the second database maintained by the first exchange.

16. The system of claim 13, wherein the determining of the second net position, further comprises recognizing intra-commodity spreads and inter-commodity spreads with respect to the third exchange.

17. The system of claim 13, wherein the third exchange is different from first and second exchanges.

* * * * *